June 21, 1955 — H. W. WYLIE — 2,711,237
ONE-REVOLUTION CLUTCH
Filed March 18, 1950
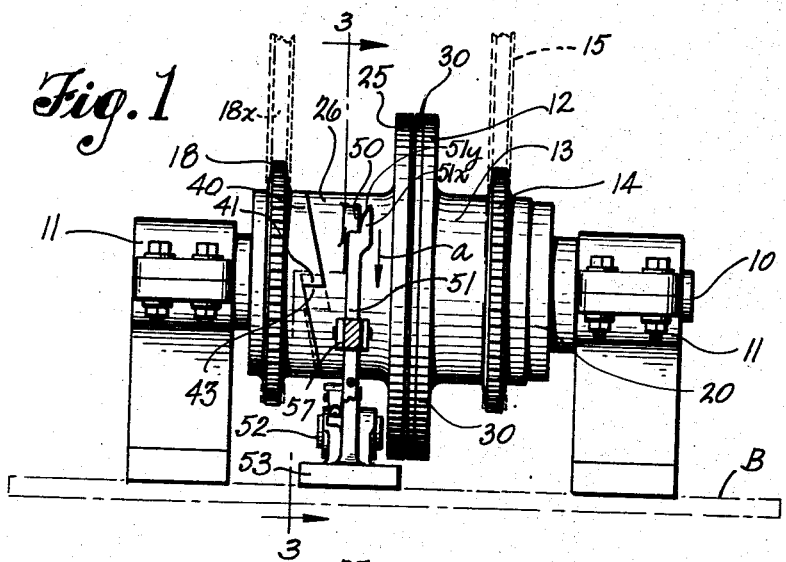
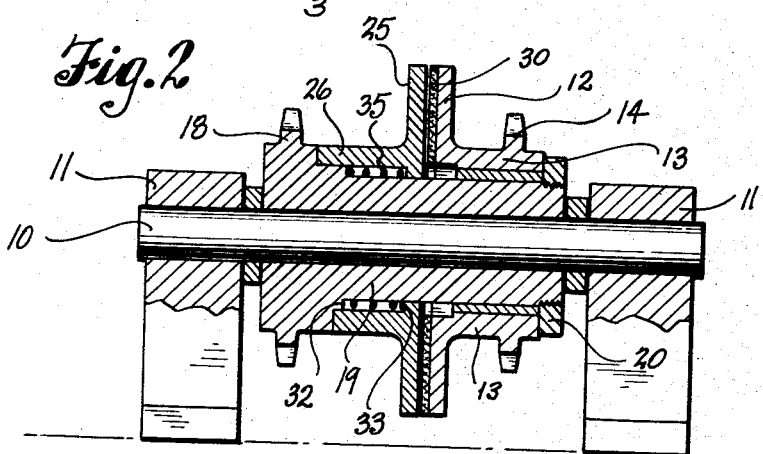
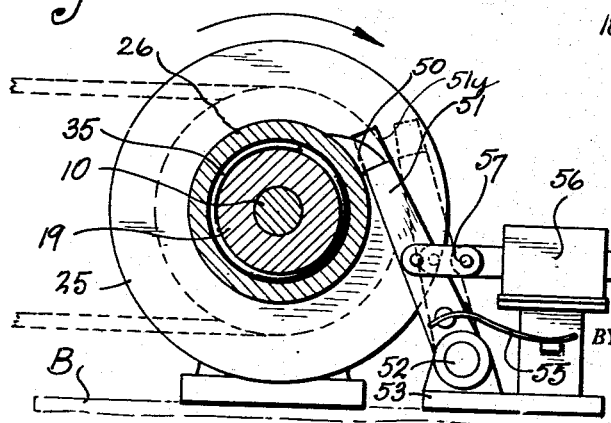
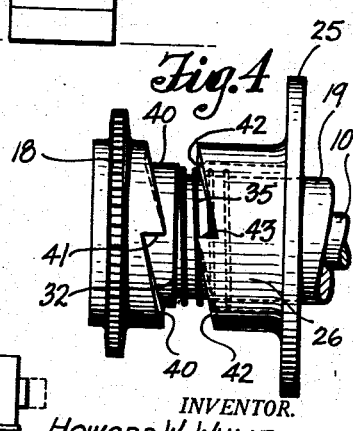
INVENTOR.
HOWARD W. WYLIE
BY Cook & Robinson
ATTORNEYS

United States Patent Office 2,711,237
Patented June 21, 1955

2,711,237

ONE-REVOLUTION CLUTCH

Howard W. Wylie, Seattle, Wash.

Application March 18, 1950, Serial No. 150,423

1 Claim. (Cl. 192—33)

This invention relates to clutches and has reference more particularly to a clutch of that type generally referred to as a "one-revolution" clutch.

It is the principal object of this invention to provide a clutch of the above kind, that is designed for high-speed operation, for positive and definite stopping, and embodying novel features of construction that, regardless of the high speed of the driven member and the abruptness with which it is stopped, its starting and stopping will be without undue shock, and the stopping will be at the exact position of starting.

It is also an object of the invention to provide a clutch having a friction disk connection between the driven and driving members, thus to avoid the strain and jolt of abrupt starts and stops that is typical where clutches of the jaw types are used.

Still another object of the invention is to provide a clutch of the above character wherein the shifting of the friction disks out of driving contact is automatically effected incident to the easing of the driven member to a final, definite stop.

Other objects and advantages of the invention are to be found in the details of construction of parts embodied in the present clutch and in their relationship and mode of use as will hereinafter be fully described.

In accomplishing the various objects of the invention, I have provided the improved details of construction, the preferred forms of which are illustrated in the accompanying drawings, wherein:

Fig. 1 is a side view of a clutch mechanism embodying the improvements of the present invention therein.

Fig. 2 is a central, longitudinal section of the clutch taken in a vertical plane along its axial line.

Fig. 3 is a cross-section taken substantially on the line 3—3 in Fig. 1.

Fig. 4 is a detail showing, in side view, parts of the clutch mechanism shown as shifted to spaced relationship for explanatory purposes.

Referring more in detail to the drawings:

In one of the present preferred forms of construction, the clutch elements are supported for rotation about a fixed countershaft 10, which is here shown as being held at its ends in supports or brackets 11—11 fixed to a base plate B.

The clutch mechanism includes parts that I will refer to as the "driving member" and as the "driven member."

As best shown in Fig. 2, the driving member comprises a friction disk 12 that is equipped at one side with a hub 13 about which a sprocket wheel 14 is applied or formed, thereby to adapt the hub and disk 12 to be rotatably driven by applying a chain belt 15 about the sprocket wheel as has been indicated in Fig. 1.

The driven member comprises a sprocket wheel 18. This wheel 18 is the element through which driving power is transmitted to a machine, and in Fig. 1, I have indicated the connection with the driven machine to be in the form of a chain belt 18x operating about wheel 18. This wheel is equipped at one side with a rather elongated cylindrical hub portion 19 that is revolubly mounted on the supporting shaft 10 between the brackets 11—11. The driven member, comprising the disk 12 and its integral hub 13, is fitted to and is freely revoluble on the hub portion 19 of the driven member and it is retained against longitudinal shifting thereon by engaging at one end with a nut or collar 20 that is threaded and secured on that end portion of the hub 19 that is opposite the end that mounts the sprocket wheel 18.

Also freely revolubly mounted on the hub 19, and located thereon between the sprocket wheel 18 and friction disk 12, is a friction disk 25, equipped at one side with a hub portion 26. The friction disk 25 is of the same diameter as disk 12 and is mounted in directly opposed relationship thereto. A clutch lining disk 30 is applied to the face of disk 12 and this is engaged by the inner surface of the disk 25 when the clutch is set.

It is shown best in Fig. 2 that a helical spring 35 is applied about the extended hub portion 19 of the sprocket wheel 18 and is contained within the hub portion 26 of disk 25 as in Fig. 2. This spring seats at one end against an annular shoulder 32 on the hub 19, and at its other end seats against an opposedly related shoulder 33 within the hub 26. The spring is held under light compression; that is, just sufficient force is applied thereby to urge the disk 25 into contact with disk 13 but not with sufficient force to produce the necessary friction between disk surfaces for driving the mechanism to which gear wheel 18 is connected. This light friction, however, causes the disk 25 to tend to turn with the driven disk 12.

It is a feature of this invention that the hub portion 19 of friction sprocket wheel 18 is equipped with a plurality of helically directed cam surfaces, best shown at 40 in Fig. 4, extending between abrupt stops or shoulders 41. These cam surfaces are in opposed relationship to similarly sloping cam surfaces 42 and oppositely related shoulders 43 formed on that end of the hub 26 that is opposite that which mounts the disk 25. The direction of slope of these cam surfaces is such with respect to the direction of driving of the disk 25 when in contact with disk 12 that the resistance to turning of wheel 18 will effect the crowding of the disk 25 toward the disk 13. A better explanation of this action would be to say that, considering the parts as seen in Fig. 1, and assuming that the sprocket wheel 18 and its hub 19 are standing still, if disk 25 is suddenly released for turning while urged by spring 35 into frictional contact with disk 12, the disk 25 and its hub will be rotated in the direction of arrow $a$ thereon. This turning causes the cam surfaces 42 to slide in a like direction along cam surface 40, thus to effect the crowding of the disk 25 more tightly against the disk 12, and in this way effect the turning of the wheel 18. It is to be understood that the disk 12 and its hub are held against endwise movement by the abutment of the end surface of hub 13 against the nut 20 that is threaded onto the end of hub 19. Relative turning of the hub 26 on hub 19, that results in the wedging action, eliminates the abrupt starting jar and strain on the driven member.

As a means of controlling the starting and stopping of the driven member, I provide the hub 26 of the disk 25 with a stop lug 50 at one side thereof as shown in Fig. 3, to be engaged against a stop lever 51 that is pivotally mounted by a bolt 52 on a block 53 that is fixed to the base B. The stop lever is adapted to be adjusted into and from stopping contact with the lug. When the stop lever is shifted so as to clear the stop, the disk 25 and its hub 26 are free to turn in the direction indicated in Fig. 3. Various means may be utilized for the control of the stop lever. In the present instance it is urged toward holding position by a spring 55, and is connected with a solenoid 56 by link 57 to be moved from holding contact with the lug by energizing the solenoid. Positive stopping of the hub 26 is effected when the lever 51 is permitted to swing to position for engagement by the lug 50. Then the driven wheel 18 is positively stopped when the shoulders 41 on hub 19 come flatly against shoulders 43 on hub 26.

Assuming the various parts to be so constructed and assembled, the mode of operation is as follows: With the stop lever 51 engaged with the stop lug 50, as in Fig. 3, the wheel 18 will be held against rotation by reason of the directly opposed engagement of the shoulders 43 and 41 on the hub portions 19 and 26. Assuming, further, that the disk 12 is being continuously driven through the mediacy of sprocket wheel 14 and belt 15, and that the spring 35 is urging the disk 25 lightly against disk 12, it will then be understood that should lever 51 be lifted from holding contact with stop 50 by momentarily energizing the solenoid, the disk 25 will immediately start to turn with disk 12. The wheel 18, however, at this time is held against rotation by reason of the belt connection 18x with the machine at rest. This results in there being a relative advance turning of the hub 26 on hub 19 and a lateral crowding action on hub 26 due to the cam surfaces 41 and 43 that results in a firm driving connection between the disks 12 and 25 and a positive driving of wheel 18.

When the relative turning of hubs 26 and 19 takes place under this starting action, the shoulders 41 and 43 thereon move apart as, for example, to the dotted line relationship in Fig. 1. This rather resisted turning action is important since it provides for starting the driven element 18 without the abrupt jolt and strain that is characteristic of jaw clutch operation.

When the stop lever 51 is released, and allowed to be drawn back to stopping position, the lug 50 will then come into solid engagement therewith, as in Fig. 3, to immediately stop the hub 26. The wheel 18, however, will continue to advance until the shoulders 41 again come flatly into contact with shoulders 43, and then the wheel 18 will be abruptly stopped. This slight turning of hub 19 within hub 26 permits that slight endwise movement of the hub 26 and disk 25 away from the driving disk 12 that is necessary to release the driving connection.

In order that this disengaging of the disk 25 from disk 12 may be positively insured, I have provided the swinging end of the stop lever 51 with a laterally offset extension 51x formed with a cam surface 51y adapted to engage against a side edge of lug 50 as the lug approaches the end of lever 51, to push the lug very slightly to the left, as seen in Fig. 1.

There are various other ways in which the clutch element 12 and its hub 13 might be driven, and various other ways of transmitting power from the driven disk 25. For example, the power might be applied to hub 13 by a gear train and instead of applying a sprocket wheel 18 to hub 19, thus hub could be keyed on shaft 10 and the driving wheel or sprocket applied to shaft 10 or power otherwise transmitted from shaft 10. Therefore, it is not the intent that the invention be restricted only to details and arrangements of parts as shown.

It is further to be explained that the spring 35 might also be applied about the outside of hub 26 if so desired, to exact slight force against wheel 18 and disk 25.

The present device is especially adapted for high speed operations because of the cushioning action both at starting and stopping, and because of the positiveness and definiteness of the stopping action.

Such clutches are simple in construction, yet effective and long wearing in use.

Having thus described my invention, what I claim as new therein and desire to secure by Letters Patent is:

A clutch of the character described comprising a driving element including a revolubly mounted hub equipped with a friction disk, a driven member having a hub portion revoluble within and coaxially of the said driving element, a second friction disk revoluble coaxially of the first disk and about said driven member and having limited movement in its axial direction to permit functional engagement and disengagement of the disks, a positive stop means for the second mentioned disk including a lug on the hub of said disk and a pivotally fixed lever, means for moving the lever into and from positive stopping contact with the lug, opposedly related cam elements on the hub portions of the second mentioned disk and driven member, having coacting helically inclined surfaces whereby the advance turning of the second mentioned disk relative to the driven member immediately upon the release of the stopped disk effects the crowding of the two disks into functional driving contact and the driving of the driven element, and there being opposedly related stop shoulders on the cam elements that move apart with said advance turning of the second mentioned disk, and move together and into contact to positively stop the driven member incident to engaging the stop lever with the lug of said second mentioned disk; said driven member comprising a shouldered hub portion on and about which said driving element and said second disk revolve, and a coiled spring applied about a portion of said hub to bear at opposite ends against the hub shoulder and said second disk to urge the said second disk toward the first disk; said stop lever being formed with an extension having a cam surface against which said lug will engage while coming to positive stopping engagement with the said lever, and whereby the said second mentioned disk will be positively shifted laterally to disengage the friction disc of the driving element.

References Cited in the file of this patent

UNITED STATES PATENTS

| 1,435,482 | Lamb et al. | Nov. 14, 1922 |
| 1,606,072 | Havener | Nov. 9, 1926 |
| 2,474,876 | White | July 5, 1949 |

FOREIGN PATENTS

| 1,439 | Great Britain | Dec. 18, 1897 |
| 141,340 | Great Britain | Apr. 10, 1919 |
| 728,714 | France | Apr. 18, 1932 |